United States Patent
Nielsen et al.

(10) Patent No.: US 7,025,944 B2
(45) Date of Patent: Apr. 11, 2006

(54) PROCESS FOR THE PREPARATION OF AMMONIA

(75) Inventors: Svend Erik Nielsen, Fredensborg (DK); Claus J. H. Jacobsen, Jaegerspris (DK); Henrik Udesen, Holte (DK); Tine Shim, Birkerød (DK); Niels Kegel Sørensen, Snekkersten (DK)

(73) Assignee: Häldor Topsoe A/S, Lyngby (DK)

( * ) Notice: Subject to any disclaimer, the term of this patent is extended or adjusted under 35 U.S.C. 154(b) by 282 days.

(21) Appl. No.: 10/612,147

(22) Filed: Jul. 3, 2003

(65) Prior Publication Data

US 2004/0057891 A1    Mar. 25, 2004

(30) Foreign Application Priority Data

Jul. 11, 2002    (DK)    .................... PA 2002 01088

(51) Int. Cl.
*C01C 1/04*    (2006.01)
*B01J 27/24*    (2006.01)

(52) U.S. Cl. ................. 423/362; 423/363; 502/200

(58) Field of Classification Search ............... 423/362, 423/363; 502/200
See application file for complete search history.

(56) References Cited

U.S. PATENT DOCUMENTS

| 4,130,506 A | * | 12/1978 | Collier et al. | ................ 252/1 |
| 4,600,571 A | | 7/1986 | McCarroll et al. | |
| 5,004,709 A | | 4/1991 | Stranford et al. | |
| 6,479,027 B1 | * | 11/2002 | Jacobsen | ................ 423/362 |
| 6,699,815 B1 | * | 3/2004 | Rei et al. | ................ 502/200 |
| 2005/0053541 A1 | * | 3/2005 | Forni et al. | ................ 423/362 |

FOREIGN PATENT DOCUMENTS

| EP | 1 095 906 A2 | 5/2001 |
| GB | 2 033 776 A | 5/1980 |

* cited by examiner

*Primary Examiner*—Wayne A. Langel
(74) *Attorney, Agent, or Firm*—Dickstein Shapiro Morin & Oshinsky LLP

(57) ABSTRACT

Process for the preparation of ammonia comprising contacting ammonia synthesis gas with one or more catalysts, at least one catalyst having supported ruthenium as the active catalytic material supported on a nitride on a secondary support. A catalyst for use in the above process is provided.

4 Claims, 7 Drawing Sheets

PROCESS FOR THE PREPARATION OF AMMONIA

This invention relates to a process for the synthesis of ammonia at high plant pressures and capacities by contacting ammonia synthesis gas with an ammonia catalyst based on ruthenium. The process can be applied in new plants as well as in revamp situations.

BACKGROUND OF THE INVENTION

The first ammonia synthesis loops all used axial flow converters. Due to the axial flow configuration, larger catalyst particles, typically iron based catalysts, were used (typically 6–12° mm) resulting in pressure drops of 15–20 bar around the synthesis loop and significant rate limitations due to mass transport restrictions.

In the 1950s, steam reforming at pressures of 0.5 to 15 bars was introduced in USA, thereby significantly reducing the capital cost of the plants. Until around 1950, plant capacities were expanded by installation of parallel lines of about 70–120 MTPD (Metric Tons Per Day) units. With a few exceptions, the synthesis process ran at pressures of about 300 to 350 bars.

In the period from 1965 to 1985, the concept of integrated plant design was pioneered. This was achieved through construction of large single-train plants with high degrees of energy integration. This resulted in most new plants being based on steam reforming at pressures of 15–30 bars and in ammonia synthesis loops containing catalyst beds operating around 140–220 bars with iron based catalysts. Use of inherently more active, smaller catalyst particles (down to 1.5–3 mm) was made possible through the invention of radial flow and horizontal converters. This decreased the pressure drop in the synthesis loop to around 9–10 bar and at the same time essentially removed the significant mass-transport-limitations of the reaction rate.

In the period from 1985 until today, larger plants have been constructed with some improvements, which have led to specific energy consumption down to approximately 28 GJ/ton of ammonia product. The first commercial non-iron ammonia synthesis catalyst was introduced in the KAAP process of M. W. Kellogg. The promoted ruthenium catalyst on a special graphitised carbon support was claimed to be significantly more active than the traditional promoted iron catalyst. New significantly improved ruthenium catalysts have been reported. DK patent application No. PA 2000 01052, which is incorporated herein by reference, discloses a barium promoted ruthenium catalyst on magnesium oxide support. Ba—Ru/MgO has been claimed to be more active than the commercial Ru catalyst and it exhibited stable activity for 1000 hours at 750° C. at 50 bars. U.S. patent application Ser. No. 09/692,037, which is incorporated herein by reference, discloses a barium promoted ruthenium catalyst on a boron nitride support, Ba—Ru/BN. This catalyst has unprecedented activity and stability and was developed through insight into both the optimal ruthenium crystal size and the influence of the support on the catalytic activity.

Boron nitride (occasionally known as "white graphite") is a very attractive support material for ruthenium-based ammonia synthesis catalyst. Boron nitride is iso-electronic with carbon, and boron nitride exists just like carbon in several allotropic forms. It has almost the same structure as graphite, except for a different stacking of the individual layers, but it is completely stable towards hydrogenation under all conditions relevant to industrial ammonia synthesis. At the same time, boron nitride is known for its high temperature resistance.

The Ba—Ru/BN catalyst has proved completely stable in 5000 hours operation at 100 bar and 550° C. in an equilibrated 3:1 dihydrogen/dinitrogen mixture. In FIG. 1, the activity and stability of this catalyst is compared to a similar catalyst supported on high surface area graphite. The boron nitride-supported-catalyst is stable also at significantly higher pressures and temperatures.

The activities of the Ru/BN and Ru/C catalysts are measured at 400° C. Ru/BN is aged at 550° C. and Ru/graphite at 450° C.

Ba—Ru/BN exhibits the same reaction kinetics as barium promoted ruthenium on a carbon support Ba—Ru/C. Compared to promoted iron catalysts this means less inhibition by ammonia, lower dihydrogen reaction order and higher activation energy.

The choice of front-end, ammonia synthesis converter and loop configuration has been changed to allow reduced specific investments and to lower the energy consumption. Furthermore, the plant capacities have increased.

Table 1 shows a comparison between various known ammonia synthesis loop configurations.

TABLE 1

Comparison between various known Ammonia Synthesis Loop Configurations

|  | Historical | 1st generation integrated plants | 2nd generation integrated plants | |
| --- | --- | --- | --- | --- |
| Capacity, MTPD | 100 | 1000 | 2000 | 2000 |
| Synthesis Catalyst | Fe | Fe | Fe/Ru | Fe |
| Converter Type | TVA[1] | 2-bed radial | 4-bed radial | 3-bed radial |
| Loop Pressure, bar | 330 | 220 | 90 | 140 |
| Syngas compressor power, kWh | 2700 | 15400 | 14300 | 19500 |
| Refrigeration compressor power, kWh | 350 | 3000 | 11500 | 7700 |
| Cooling water consumption, m³/h | 850 | 3200 | 8200 | 6400 |
| Make-up gas pressure, bar | 1 | 26 | 31 | 31 |

[1]Counter-current type of converter.

Since there is still a demand for increased plant capacities, it is important to be able to build even larger plants. This requires an increased pressure in the synthesis loop, e.g. 200 bars simply to reduce the equipment and pipe sizes. Utilising more active catalysts would also assist in reducing equipment sizes. The Ru catalyst on the BN support is perfectly suited for these conditions since it is completely stable towards hydrogenation, which could be a severe problem with carbon supported catalysts at the higher dihydrogen pressures.

Since the current world scale grass root plants provide approximately 2,000 MTPD (2,205 STPD (Short Tons Per Day)) of ammonia, it would be desirable if plants producing above 4,500 MTPD (4,961 STPD) could be built. This is due to the investment per ton of ammonia being approximately 20% lower in such a large plant.

It appears that with the currently available technology, the capacity limitation is around 3,000 MTPD (3,308 STPD) of ammonia.

These problems are, however, solved by the process and catalyst of the invention herein.

SUMMARY OF THE INVENTION

The present invention is directed to the synthesis of ammonia from dinitrogen and dihydrogen in a process that is especially suited for plants with large capacities and high pressures.

Another object of the invention is to provide a process for ammonia synthesis, whereby the specific energy consumption has been reduced.

It is a further object of the invention to provide a catalyst for ammonia synthesis.

These objectives are achieved by the process of the invention, which concerns a process for the preparation of ammonia from ammonia synthesis gas by contacting the synthesis gas with one or more catalysts, at least one catalyst having supported ruthenium as the active catalytic material supported on a nitride on a secondary support.

The invention also concerns a catalyst active in the preparation of ammonia from ammonia synthesis gas according to the above process comprising ruthenium as the active catalytic material supported on a nitride on a secondary support.

Traditionally, a two-bed radial flow converter has been installed in many plants. However, in order to boost the capacity of the plant a higher conversion in the ammonia synthesis loop is required. This can be achieved by adding in series a converter downstream of the existing converter.

Using a conventional iron-based ammonia synthesis catalyst will typically require a catalyst volume in the second converter of a similar size as or even larger than that in the existing main converter. Installing such a big converter in an existing plant is most often a problem due to space limitations in the synthesis loop area.

By being able to use the much more active ruthenium catalyst on a nitride on a secondary support, the size of the second converter can be reduced significantly, and then sufficient space is available for introducing the second converter. Furthermore, the equipment cost will decrease significantly.

Promoted ruthenium catalysts supported on boron nitride are completely stable during catalytic ammonia synthesis as they are not susceptible to hydrogenation under industrial conditions.

Boron nitride (BN) can be obtained as a high surface area material with a surface area larger than 25 $m^2$ per gram, and shaped into suitable carriers by methods known in the art.

The ruthenium catalyst supported on BN is therefore suitable for revamping existing ammonia synthesis loops operating at high pressure due to the high stability of the BN carrier. For primarily grass root ammonia plants, the benefit lies in the potential for building large capacity plants and lower equipment costs.

The nitride of silicon, $Si_3N_4$, also has properties similar to those mentioned for nitride of boron and this material is therefore also suitable as a support for ruthenium as the active catalytic material in ammonia synthesis.

In accordance with the invention, the nitrides of boron or silicon are placed on a secondary support. This secondary support can for example be alumina, silica or magnesium aluminium spinel. Promoted ruthenium catalysts, supported on nitrides of either boron or silicon and with a secondary support material, are completely stable during catalytic ammonia synthesis.

DETAILED DESCRIPTION OF THE INVENTION

The catalyst of the invention is based on ruthenium as the active component and the ruthenium is supported on a nitride on a secondary support. The nitride can be boron nitride or silicon nitride. Boron nitride is a relatively expensive material since the raw materials for producing boron nitride are quite costly. In addition the processing steps require high temperatures in corrosive atmospheres. Consequently specialised, expensive equipment is required.

Support materials based on oxides are relatively inexpensive and in the catalyst of the invention, the nitride material has been partially replaced by an oxide support material to produce a much less expensive catalyst. The catalyst of the invention is prepared by covering an inexpensive support such as an oxide support with boron or silicon nitride.

This is done by impregnation of the oxide support with for instance a boron precursor followed by nitridation. It requires that a sufficient amount of boron is introduced by impregnation and that the support material maintains a high surface area (higher than 25 $m^2$/g) after nitridation, which is typically conducted at high temperatures.

Examples of secondary supports that can be used in the catalyst of the invention are alumina, silica, and magnesium oxide-and magnesium aluminium spinel.

The nitride-covered secondary support material is significantly less expensive than for instance pure boron nitride, while exhibiting the same stability and overall activity.

The advantages of producing ammonia under high pressure using a ruthenium catalyst on BN or silicon nitride on a secondary support material are:

plant capacities can be increased without the use of very large reactors and equipment cost can be decreased.

existing plant capacities can be increased.

space (plot area) can be utilised efficiently, e.g. by replacing large converters with smaller converters containing the ruthenium catalyst on a nitride support.

The following examples illustrate the preparation of the catalyst of the invention and its application in an ammonia preparation process as compared to a conventional process utilising a conventional ammonia catalyst.

EXAMPLES

Example 1

Preparation of Nitride Covered Secondary Support Material.

Extrudates of high surface area magnesium, aluminium spinel with a surface area of 180 $m^2$/g are calcined at 500°

C. and impregnated with 5 wt % of boron. The extrudates are then dried and nitrided by flowing ammonia at 1 atm over the extrudates at 900° C. or at 1100° C. After nitridation, the sample treated at 900° C. had a surface area of 100 $m^2/g$, while the sample treated at 1100° C. had a surface area of 15 $m^2/g$.

Figure 1:
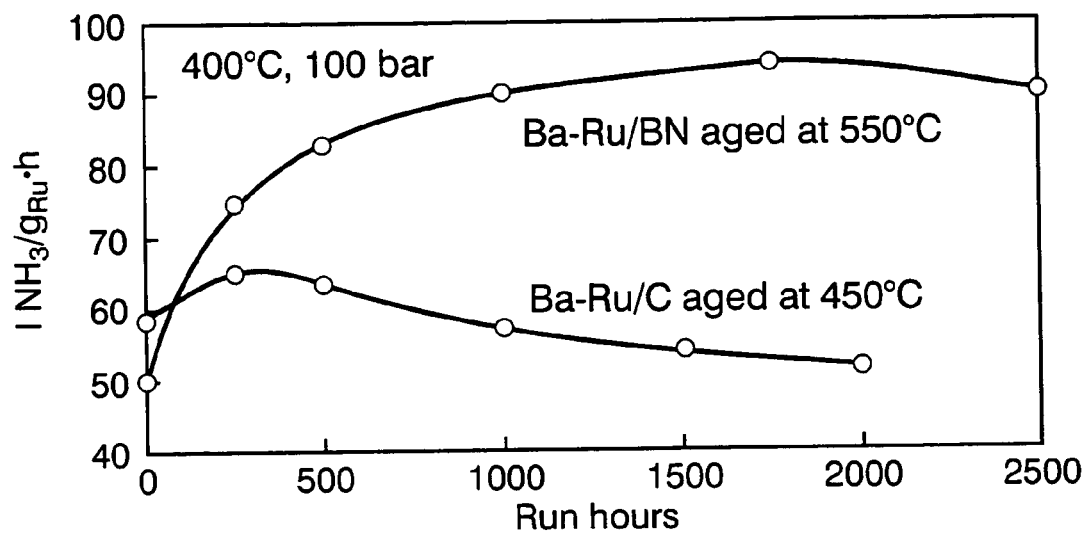
FIG. 1 is a comparison of the activity and stability of a Ba—Ru/BN catalyst as compared to a similar catalyst supported on high surface area graphite.
Figure 2:
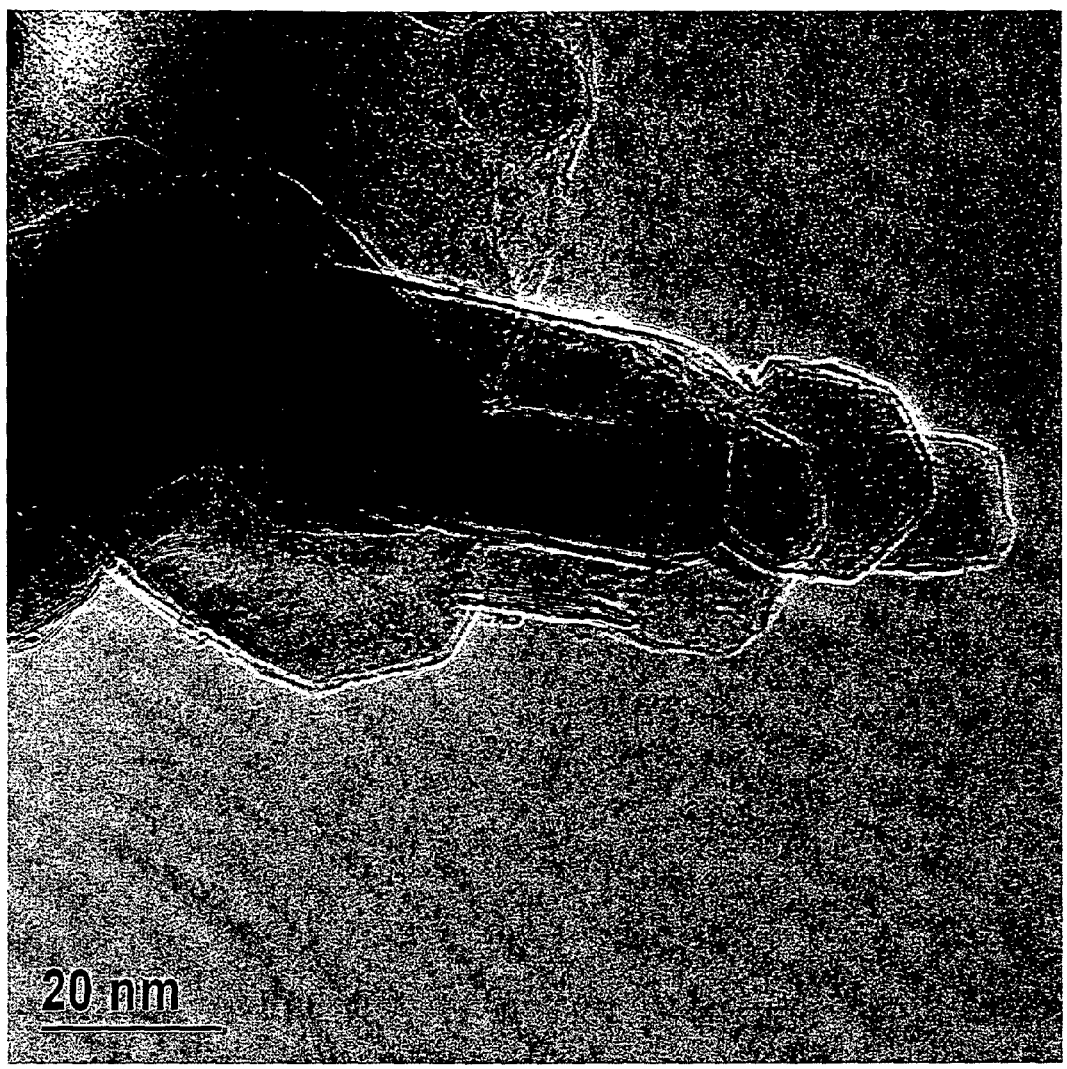
FIG. 2 shows spinel crystals covered with boron nitride.
Figure 3:
FIG. 3, a higher resolution of FIG. 2, shows that the boron nitride almost completely covers every spinel crystal.

A study of the samples using high-resolution transmission electron microscopy (TEM) at two different resolutions showed that the spinel crystals nitrided at 1100° C. are covered with boron nitride. FIG. 2 shows that the spinel crystals are covered with boron nitride, while a higher resolution, as shown in FIG. 3 shows that the boron nitride almost completely covers every spinel crystal. Approximately 5–6 layers of boron nitride are seen to surround the spinel crystals.

Figure 4:
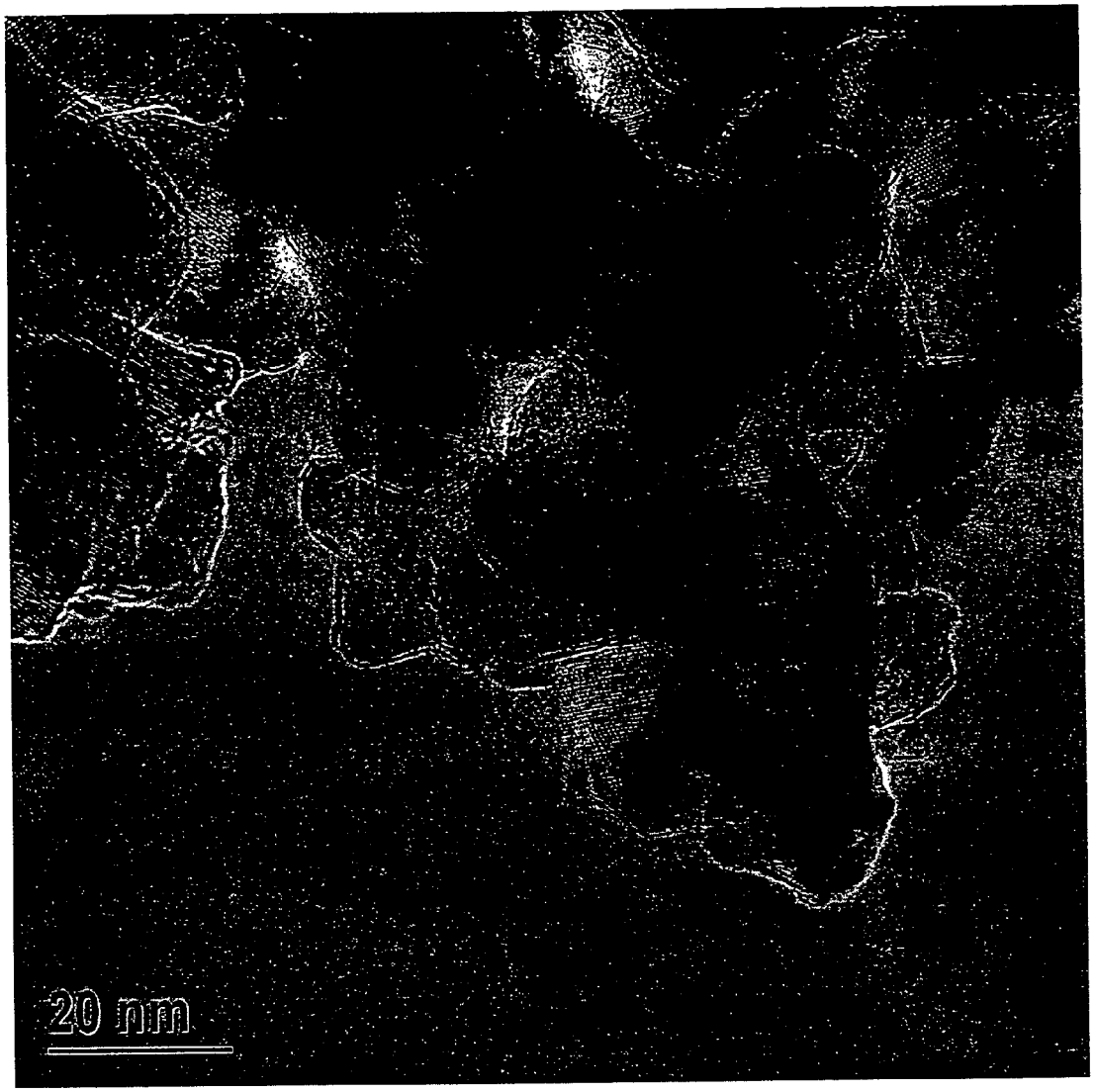
FIGS. 4 and 5 show TEM images of the spinel sample nitrided at 900° C.
Figure 5:

FIGS. 4 and 5 show TEM images of the spinel sample nitrided at 900° C. It is seen that at this temperature the spinel crystals are covered with boron nitride. Fewer nitride layers are formed and some of the spinel crystals are not completely covered. It is, however, possible to compensate for this by increasing the boron concentration.

Preparation of Catalyst.

Several nitride covered spinel samples prepared as described above were impregnated with ruthenium nitroso nitrate. The impregnated samples were dried at 80° C. and reduced in a flow of dihydrogen at 450° C. The samples were then promoted with barium by impregnation with aqueous solutions of barium nitrate.

The resulting catalysts had ruthenium concentrations between 4–15 wt %, with barium content of 5–18 wt %. The particle densities were between 0.8 and 1.2 ml/g.

The catalysts had an overall activity similar to that of ruthenium on boron nitride, but were much cheaper to prepare.

Example 2

Comparison Example

Ammonia Preparation—Conventional Process.

Figure 6:
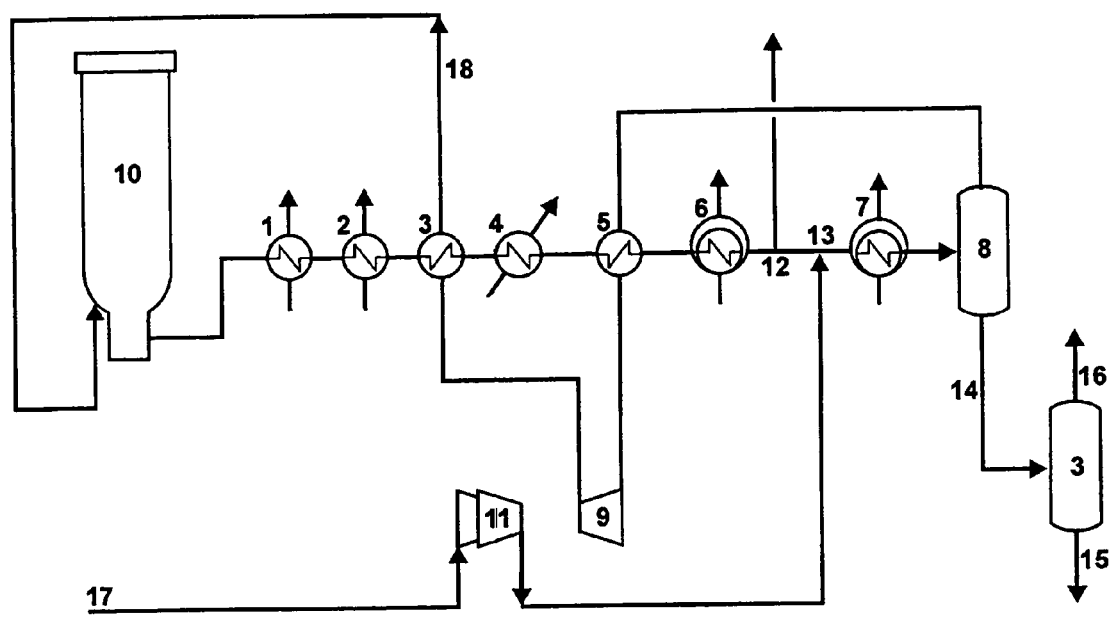
FIG. 6 depicts a current process for the preparation of ammonia from make up synthesis gas consisting of hydrogen and nitrogen.

FIG. 6 depicts a current process for the preparation of ammonia from make-up synthesis gas consisting of hydrogen and nitrogen. The capacity is 2050 MTPD.

The ammonia synthesis loop depicted in FIG. 6 comprises an ammonia reactor 10, a number of heat exchangers and chillers 1–7, a product ammonia separator 8 and a recirculation compressor 9. The heat exchangers and chillers 1–7 are used for recovery of the reaction heat and cooling of the reactor effluent to condense the product ammonia.

In the present case the ammonia reactor 10 is a two bed radial flow converter with a catalyst volume of 82 $m^3$.

As the ammonia reaction is an equilibrium reaction only approximately 25% of the hydrogen and nitrogen content of the converter feed gas stream 18 is converted into ammonia during passage through the reactor. Furthermore, as the reaction is exothermic, the temperature increases from 245° C. to 460° C. The operating conditions of the reactor are shown in Table 2.

The effluent from the reactor 10 is cooled in the boiler 1 and the boiler feed water-preheater 2 (BFW-preheater) for recovery of the heat of reaction. Hereafter the effluent is further cooled in the feed/effluent heat exchanger 3 by heat exchange with the converter feed stream 18. The effluent then passes through the water cooler 4 in which a significant part of the product ammonia is condensed. Downstream of the water cooler 4, the reactor effluent is further cooled to about 0° C. in a refrigeration arrangement, which consists of two chillers 6 and 7 and a gas/gas heat exchanger 5 for recovery of refrigeration energy. To prevent accumulation of inert gases in the loop, a small purge gas stream is rejected at position 12 downstream of the first chiller 6. After compression in the make-up gas compressor 11, the make-up gas 17 from the gas preparation train is introduced into the loop at position 13 at the entrance to the last chiller 7. By introducing the make-up gas at this position, its content of moisture and the last traces of $CO_2$ are removed by co-condensation in the chiller 7. The effluent from said chiller flows to the separator 8 for separation of the product ammonia. The gaseous effluent from said separator flows to the gas/gas heat exchanger 5 for recovery of refrigeration energy by heat exchange with the effluent from the water cooler 4. Hereafter the gas is transferred to the recirculation compressor 9 in which the pressure is raised to overcome the pressure drop in the loop. Finally the gas passes the feed/effluent heat exchanger 3 for preheating to the required reactor inlet temperature by heat exchange with the effluent from the BFW-preheater 2, before it is introduced into the reactor 10.

TABLE 2

Operating Conditions for a Conventional Ammonia Plant

| | Unit | Converter |
|---|---|---|
| Inlet converter: | | |
| Pressure | Barg | 192 |
| Temperature | ° C. | 245 |
| Flow | $Nm^3/h$ | 898,830 |
| $NH_3$-conc. | Mole % | 4.14 |
| Exit converter: | | |
| Temperature | ° C. | 459 |
| $NH_3$-conc. | Mole % | 19.02 |
| Production rate: | MTPD | 2050 |

Example 3

Ammonia Preparation—Process of the Invention.

Figure 7:
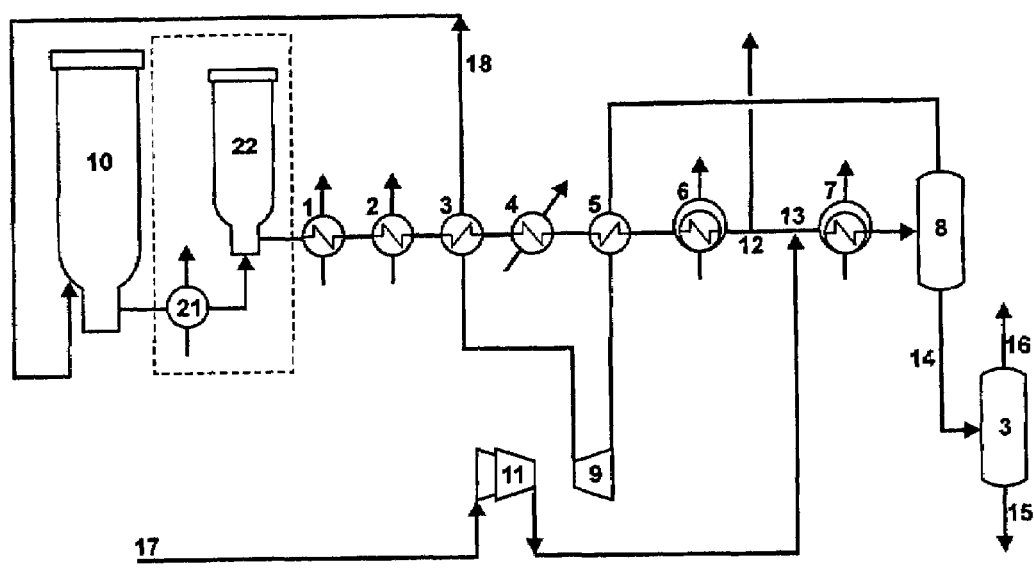
FIG. 7 depicts a process representing an embodiment of the invention.

FIG. 7 depicts a process representing an embodiment of the invention. In this process synthesis gas made up of hydrogen and nitrogen is converted to ammonia and the 2050 MTPD ammonia synthesis loop depicted in FIG. 6 has been revamped to a capacity of 2650 MTPD. Compared to the conventional plant shown in the process flow diagram of FIG. 6, the following new equipment has been added:

an additional reactor 22 downstream of the original reactor 10, and cooling means 21 for the effluent from the reactor 10 before it is introduced into reactor 22.

The ammonia synthesis loop is similar to that depicted in FIG. 6 and the various units are numbered as in FIG. 6. The reactor 22 is loaded with a ruthenium catalyst supported on boron or silicon nitride on a secondary support. The reactor can be either a simple one bed reactor or a reactor with two or more catalyst beds. In the case where two or more beds are present, the inter-bed cooling can be accomplished either in gas/gas heat exchangers or by direct injection of cool quench gas. The flow pattern in the catalyst beds can be either radial or axial.

Application of the catalyst is not limited to the reactor types mentioned, and the catalyst can therefore also be applied in other types of reactors.

The operating conditions of the two converters are shown in Table 3. The operating conditions of reactor 10 alone corresponding to FIG. 6 are as shown in Table 2.

In the case where a single bed reactor is used the required volume of ruthenium catalyst supported on boron or silicon nitride on a secondary support is about 25 m³. In contrast to this the necessary volume of a similar reactor based on a conventional iron based catalyst is approximately 165 m³. Consequently, the ruthenium catalyst yields both significant savings in the costs of equipment manufacture and handling and appreciable reductions of the space and foundation requirements.

TABLE 3

Operating Conditions for a Process utilising the Catalyst of the Invention

|  | Unit | 1st Converter | 2nd Converter |
|---|---|---|---|
| Inlet Converter: |  |  |  |
| Pressure | Barg | 192 | 189 |
| Temperature | ° C. C | 245 | 364 |
| Flow | Nm³/h | 898,830 | 786,410 |
| NH₃-conc. | Mole % | 4.14 | 19.02 |
| Exit converter: |  |  |  |
| Temperature | ° C. | 459 | 429 |
| NH₃-conc. | Mole % | 19.02 | 24.22 |
| Production rate: | MTPD | 2050 | 600 |

TABLE 3-continued

Operating Conditions for a Process utilising the Catalyst of the Invention

|  | Unit | 1st Converter | 2nd Converter |
|---|---|---|---|
| Total production rate: | MTPD | 2650 |  |

What is claimed is:

1. Process for the preparation of ammonia comprising contacting ammonia synthesis gas with one or more catalysts, at least one catalyst having supported ruthenium as the active catalytic material supported on a nitride on a secondary support.

2. Process for the preparation of ammonia according to claim 1, wherein the secondary support comprises alumina, silica, magnesium oxide or magnesium aluminum spinel.

3. Process for the preparation of ammonia according to claim 1, wherein the catalyst having ruthenium as the active catalytic material is supported on boron nitride on a secondary support.

4. Process for the preparation of ammonia according to claim 1, wherein the catalyst having ruthenium as the active catalytic material is supported on silicon nitride on a secondary support.

* * * * *